United States Patent [19]

O'Connor et al.

[11] Patent Number: 4,622,550
[45] Date of Patent: Nov. 11, 1986

[54] DATA COMMUNICATION SYSTEM

[75] Inventors: Stuart O'Connor, Glossop; Donald Bell, Stockport; Stuart L. Dean, Oldham, all of England

[73] Assignee: International Computers Limited, London, England

[21] Appl. No.: 485,873

[22] Filed: Apr. 18, 1983

[30] Foreign Application Priority Data

Apr. 28, 1982 [GB] United Kingdom ................ 8212265

[51] Int. Cl.$^4$ .............................................. H04Q 5/00
[52] U.S. Cl. ............................ 340/825.05; 340/825.5; 370/86; 370/85
[58] Field of Search ...................... 340/825.05, 825.09, 340/825.16, 825.5, 825.08, 825.65, 825.66, 825.67; 370/80, 86, 90, 96, 99, 89; 371/32

[56] References Cited

U.S. PATENT DOCUMENTS

| | | | |
|---|---|---|---|
| 3,483,329 | 12/1969 | Hunkins et al. | 370/86 |
| 3,652,993 | 3/1972 | Bridwell | 370/86 |
| 4,034,351 | 7/1977 | Takezoe | 370/90 |
| 4,149,144 | 4/1979 | Diefenderfer | 370/85 |
| 4,511,958 | 4/1985 | Funk | 370/85 |

OTHER PUBLICATIONS

"The System Architecture of the Distributed Computer System—the Communications System" by D. J. Farber & K. C. Larson, Symposium on Computer—Communications Networks and Teletraffic, Brooklyn 1972, pp. 21-27.

Gordon et al., "Ringnet: A Packet Switched Local Nework with Decentralized Contro", 4th Conference on Local Computer Networks, Minneapolis 1979, pp. 13-19.

Primary Examiner—John W. Caldwell, Sr.
Assistant Examiner—David W. Olson
Attorney, Agent, or Firm—Lee, Smith & Zickert

[57] ABSTRACT

In a ring network (1) messages sent from any one of a group of stations (3) to all the remainder include an acknowledgement field (ACK) holding a count preset to equal the number of expected destination stations. Each destination station that successfully receives the message acknowledges by decreasing the count by 1; acknowledgement is withheld if an error is detected in the message or the station cannot accept it. Acknowledgement is performed by a circuit (17) in a loop-through path (15) in an interface unit (4) connecting the station to the network (1). The originating station checks in a circuit (28) if the final value of the count on its return is zero. If so, the originating station is assured that each expected destination has made a positive acknowledgement of successful receipt.

22 Claims, 9 Drawing Figures

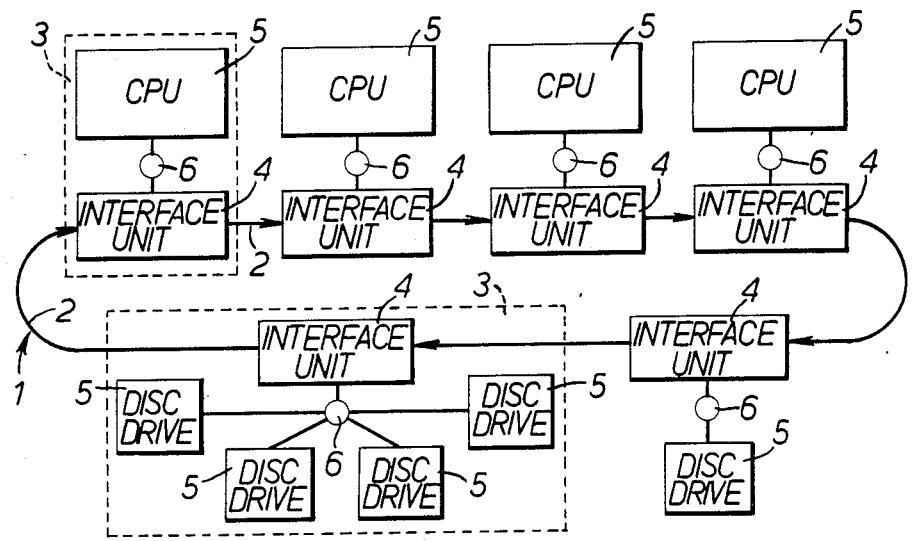
FIG.1.
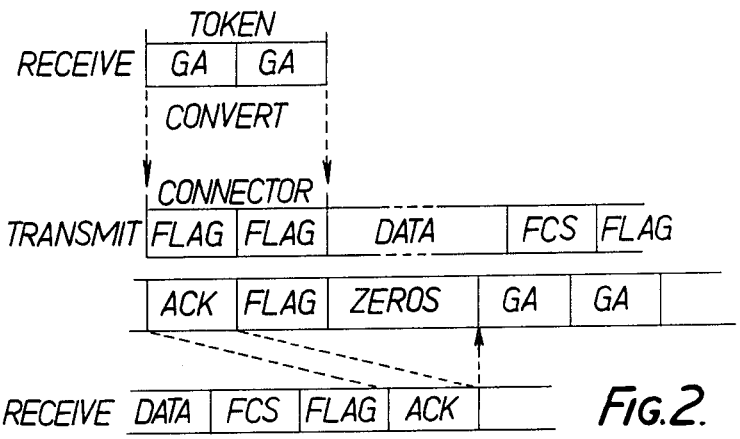
FIG.2.
GO AHEAD  01111111   TOKEN      01111111:01111111
FLAG      01111110   CONNECTOR  01111110:01111110
FIG.3.
ACK | 0 | 0̄ | 1 | 1̄ | 2 | 2̄ | 3 | 3̄ |   FIG.4.

DATA COMMUNICATION SYSTEM

BACKGROUND OF THE INVENTION

This invention relates to data communication systems in which messages travel sequentially through various stations of a network. One such network is the kind commonly referred to as a ring network. In a ring network a number of stations are connected by transmission links arranged in a ring and a message originating at any station is transmitted round the ring until it reaches its destination. The destination may be a single station, or more than one station may be a destination if the message is being broadcast to all of a given class of stations.

Many ring networks allow messages to pass right around the ring until they return to the originating station. In a number of such networks it has been proposed to exploit the fact that the message returns by including in it an acknowledgement field which is modified by a destination station, for example to indicate that the destination station has received and accepted the message. Thus the acknowledgement field may contain an "accepted" bit which is set by any station which accepts the message. However, with this procedure if the message is destined for more than one station the originating station will not be able to assure itself that every destination has accepted the message, merely that at least one has.

SUMMARY OF THE INVENTION

This invention provides a method of data communication which comprises transmitting a message from a first station which message includes an acknowledgement field holding a count set at an initial value, passing the message successively through each of a plurality of other stations some at least of which are second stations at least some of which perform an acknowledgement of the message, the acknowledgement comprising changing the value of the said count in the acknowledgement field of the message by an amount and in a direction that is constant and the same for every second station, and returning at least the acknowledgement field of the message to the first station for evaluation of the final value of the count.

With this method every station acknowledges the message by performing essentially the same operation, which is not dependent on its address. The originating station receives a positive indication of the total number of stations that have acknowledged and is able for example to assure itself that this is the desired number.

While the method may be used with any suitable procedure for regulating the right of a station to transmit, advantageously the first station retains the right to transmit until the acknowledgement field returns. Then depending on the evaluation it may either relinquish the right or employ it, for example to conduct a recovery procedure.

The invention further provides a system arranged to carry out a method according to the invention and an interface unit suitable for use in providing the coupling between a second station in such a system and the network.

BRIEF DESCRIPTION OF THE DRAWINGS

An example of a system constructed and operating in accordance with the invention will now be described in greater detail with reference to the accompanying drawings, in which
FIG. 1 is an overall block diagram of the system,
FIG. 2 illustrates the message format,
FIG. 3 illustrates certain control patterns,
FIG. 4 illustrates the acknowledgement field.

DESCRIPTION OF THE PREFERRED EMBODIMENT

Overall system

Figure 5:
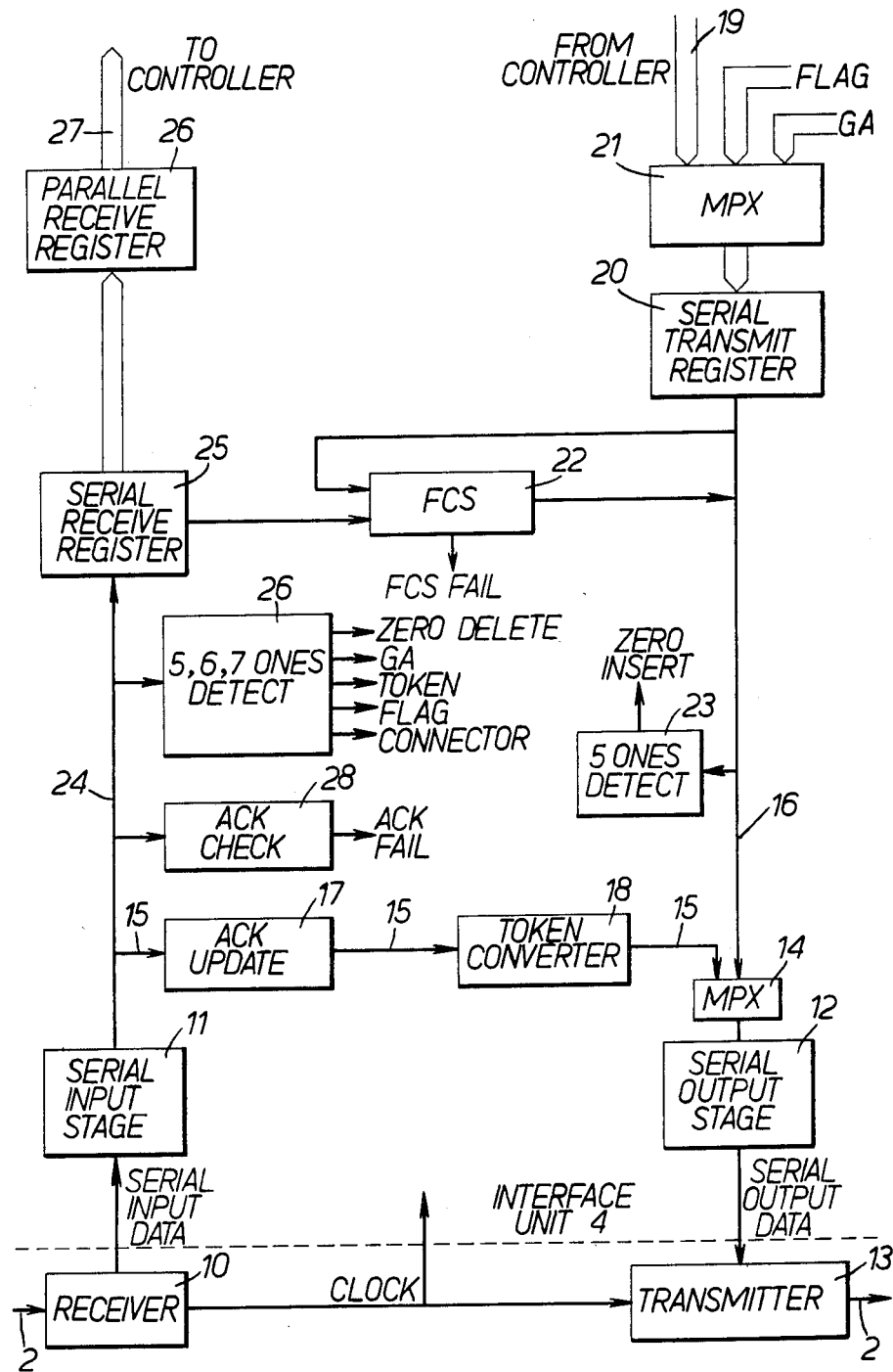
FIG. 5 is a block diagram of the interface unit.

Referring to FIG. 1, the system allows a number of devices to communicate with one another over a ring 1. The ring 1 consists of transmission links 2 joining stations 3 each of which contains an interface unit 4 to which the links 2 are joined, one or more devices 5, and a controller 6 connecting the device or devices to the interface unit 4.

FIG. 1 is purely an illustration of one possible configuration and shows four stations each containing a CPU and two stations in which the controller is an input-output controller for one or more disc drives. Other devices may of course be used. One special case is a device acting as a gateway to another network. In this case the device, although originating or receiving messages from the point of view of the ring network, actually transfers the information to or from another network.

Data passes round the ring bit-serially and in one direction only. Each interface unit 4 normally functions as an active repeater and retransmits onto its outgoing link 2 the data it receives from its incoming link 2, unless its station is transmitting, in which case it substitutes data from its controller 6 for that received. The interface unit also acts as a serialiser-deserialiser, converting serial data from the ring into parallel data for the controller and vice versa.

The ring uses a token control mechanism in which a station is able to transmit when it detects what will be termed a "token". If it wishes to transmit, it changes the token to what will be termed a "connector". It then sends its message out and finally relinquishes control by sending another token.

Messages may be sent either to one individual device or to several. For example, one CPU may broadcast a message to all the other CPUs in order to ensure that all the CPUs hold the same version of a common data item. It is especially important in such a multiprocessor system that the station originating a message should be assured that the message has been correctly received by all the stations for which it is intended, and the system being described uses an acknowledgement scheme carried out by the interface units to provide this assurance.

Message format and transmission

Referring to FIG. 2, assume a station wishes to transmit a message. Then the interface unit 4 of that station examines the data passing round the ring until it detects the token, which indicates that no other station is transmitting. In this system the token consists of two identical eight-bit bytes, each of which will be termed herein a "go-ahead", abbreviated to GA in the figures. (See also FIG. 3, which shows the bit patterns of the various control codes.) The go-ahead consists of a zero followed by seven ones. When the interface unit detects the token it changes it to a connector to prevent its being recognised by any other station. The connector is derived from the token by changing the last bit of each byte to a zero. The resulting pattern 01111110 for each byte will be termed herein a "flag".

After the interface unit has transmitted the connector it ceases to retransmit the data it receives from the ring and instead transmits data provided by its controller, preceded if desired by additional flags. Typically the data will contain the address of the source of the data, the address of the intended recipient or recipients, control information and the actual information to be passed from the source to the recipient or recipients.

The data is followed by a frame checking sequence (FCS) calculated from the data and designed to allow the detection of errors introduced into the data. The frame checking sequence is followed by a flag.

In order to ensure that the flag and go-ahead patterns are recognised as such it is arranged that a sequence of six ones does not occur elsewhere in any message over the links 2. However, it is inconvenient if this limitation is also imposed on the data, which is therefore allowed to take any form but undergoes a procedure known as "bit stuffing" in the interface unit. The interface unit breaks up sequences of six or more ones in the data to be transmitted by inserting a zero after every sequence of five ones. Then, on receipt, it recovers the data by removing every zero found after a sequence of fives ones. Bit stuffing is also applied to the frame checking sequence.

The use of a flag (as herein defined) to determine the start and end of a message, together with bit stuffing, is well known and is, for example, a part of HDLC, the high-level data link control procedure that is the subject of the International Standard ISO 3309-1976.

The flag following the frame check sequence is followed by an acknowledgement field ACK. This field is used for the acknowledgement scheme and is set by the originating station to hold a count equal to the number of stations taking part in the scheme and expected to receive the message.

The acknowledgement field is followed by a flag, which concludes the useful data included in the message. A normal token ring would at this point generate the token to allow the next unit to transmit as soon as possible. However, in this system the token is withheld and zeros are output while the message circulates round the ring.

Each interface unit which is not transmitting monitors the data on the ring for the connector. When it detects the connector it knows that a message is starting. There may be additional leading flags; when data that is not a flag is detected the significant past of the data has started to arrive and the interface unit starts to transfer it to the controller 6. It also deletes inserted zeros and starts to recalculate the frame checking sequence. The next flag indicates that the transmitted frame checking sequence has been received, and that the next field is the acknowledgement field. Assume the station is taking part in the acknowledgement scheme. Then if its value is the one expected if the data has been correctly transmitted, and the station has not failed in some other way to accept the message, the interface unit acknowledges successful receipt by decreasing the count in the acknowledgement field by one. If an error is detected or the message cannot be accepted the field is left unchanged. The same is done at each of the other destination stations in the acknowledgement scheme.

When the message has made a complete circuit of the ring it returns to the originating station. That monitors the incoming data to detect the acknowledgement field but does not re-emit the data. If the count is zero the interface unit assumes that all the expected stations in the acknowledgement scheme have received the message successfully and it outputs the token onto the ring for the next station that wishes to transmit. But if the acknowledgement field does not contain zero it knows that an error has occurred and may then, since it is still in control of the ring, carry out a recovery procedure. For example it may send a repeat of the message, indicated as such by a control field, to each expected destination station in turn. Each station responds immediately to its message to indicate whether or not it needed the retransmission and if it did whether it has now received it successfully. When all expected destinations have been polled in this manner, if they have all succeeded in receiving the message the token is issued. Otherwise a more drastic action, such as reconfiguration to eliminate a faulty station, may be necessary.

Acknowledgement field

Referring to FIG. 4, the acknowledgement field holds the count as eight bits. The first, third, fifth and seventh in order of transmission are the bits of the binary value of the count in sequence, least significant bit first. Each of these bits is followed by its inverse. So in FIG. 4 the bit labelled O is transmitted first and holds the coefficient of $2°$ in the binary representation of the count, the bit labelled O holds its inverse and so on. Thus 5, for example, is held as 10011001. This format ensures that spurious control codes will not be generated even though the field is outside the section of the message which undergoes bit stuffing.

Interface unit

Referring to FIG. 5, the incoming transmission link 2 for a station ends in a receiver 10 which extracts a data signal and a clock signal from the signal transmitted over the link. The clock signal derived from the incoming data is used by the interface unit not only in receiving incoming data but also in transmitting its own outgoing data.

The construction of the ring may be as described in U.S. patent application Ser. No. 467,305, dated Feb. 17, 1983 now U.S. Pat. No. 4,554,673. One property of this ring is that if a station is not operative it is bypassed by the ring.

Data from the receiver 10 is entered in the interface unit 4 into a serial input stage 11. Data for the ring is held in a serial output stage 12 from where it passes to a transmitter 13 at the start of the outgoing transmission link 2.

Data for the serial output stage 12 is selected by a multiplexer 14 from either a path 15 or a path 16.

The path 15 is connected to the serial input stage 11 and allows data on the ring to loop through the interface unit. It contains an acknowledgement update circuit 17 which normally leaves data unchanged but can decrease the acknowledgement count by one when required. The path 15 also contains a token converter 18 which also normally leaves data unchanged but when the interface unit wishes to transmit converts the final one bit of each of the go-aheads in the token to the zero value appropriate to a connector.

Data to be transmitted from the station is supplied to the interface unit 4 by the controller 6 over a highway 19. The controller 6 is a processor-controlled unit that buffers the data to be transferred between the interface unit 4 and the appropriate device 5 and exchanges control signals with the interface unit 4. Data supplied over the highway 19 is entered into a serial transmit register 20.

The register 20 may alternatively, when required, receive the flag or go-ahead pattern, as selected by a multiplexer 21.

The contents of the serial transmit register 20 are clocked out serially a bit at a time onto the line 16, from where they go to the serial output stage 12 via the multiplexer 14. They are also entered into a frame checking sequence (FCS) circuit 22 and, when the attached device has supplied all its data, the frame checking sequence is unloaded from the circuit 22 onto the line 16. The frame checking sequence may be a modified cyclic redundancy check of the kind described in ISO 3309-1976. Operation of such circuits is well known and the construction of the circuit will not be described further.

To allow bit stuffing a circuit 23 contains a counter, reset by every zero, which counts ones in the bit stream on the line 16 and issues a ZERO INSERT signal each time it detects five consecutive ones. Operation of this circuit is inhibited if flags or go-aheads are being output on the lines 16. The ZERO INSERT signal prevents data being clocked out of the serial transmit register 20 or FCS circuit 22 (whichever is the current source) for one beat, and thus inserts a zero into the bit stream output onto the ring.

The incoming serial data passes over a path 24 to a serial receive register 25. It also passes to a 5,6,7 ones detect circuit 26 which issues signals when it detects the various control codes and also a ZERO DELETE signal when it detects a zero folowing five ones. The ZERO DELETE signal stops that bit being clocked into the serial receive register 25, which is equivalent to deleting it.

Receipt of two flags indicates the start of a message. When non-flag data starts it is transferred, whenever eight bits have been assembled, from the serial receive register 25 in parallel to a parallel receive register 26 from where it passes to the controller over a highway 27. It is also transferred from the serial receive register 25 into the FCS circuit 22. That data is therefore also stripped of inserted zeros. The next flag indicates that the FCS itself has now been entered into the FCS circuit 22 (but not the flag, which is still held in the serial receive register). Provided the data has not been corrupted the FCS circuit will now hold a predetermined pattern. If it holds any other value an FCS FAIL signal will be produced indicating that the received data is not reliable.

If the message is one that has been originally transmitted from this station the acknowledgement field will be checked in a circuit 28 following the receipt of the flag after the FCS. If the acknowledgement field holds other than a count of zero an ACK FAIL signal will be output to the controller and recovery action will be taken as described. If the ACK FAIL signal is not produced it is assumed that all destination stations have acknowledged receipt.

Acknowledgement update circuit

Figure 6:
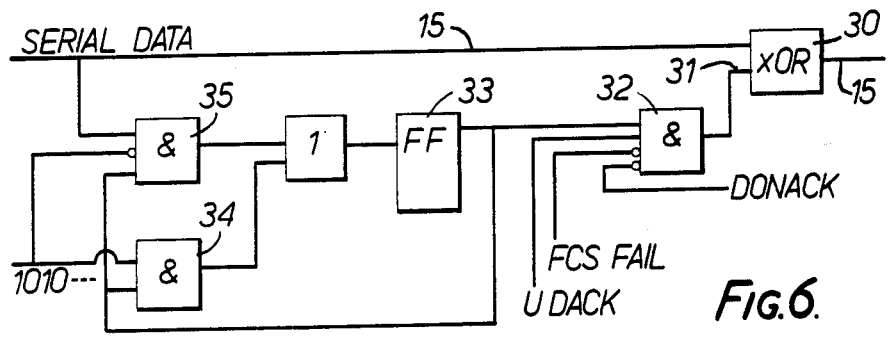
FIG. 6 is a logic diagram of the acknowledgement update circuit.

Referring to FIG. 6, in the acknowledgement update circuit 17 the serial data on the path 15 is input to an exclusive-OR gate 30. The gate 30 inverts the data if there is a one on its other input, a line 31, but otherwise leaves it unchanged. It can therefore only change the data if a number of signals applied to an AND gate 32 connected to the line 31 are in the right state. First, a signal UDACK to update the acknowledgement field, produced when a station is receiving data and in response to the flag following the FCS, must be present. This indicates that the right part of the message has been reached. Secondly the FCS FAIL signal from the FCS circuit 22 must be absent. Thirdly a signal DONACK from the controller must be absent. This signal is asserted either long-term if the station does not wish to take part in the acknowledgement scheme or for a particular message if the controller does not have buffer space to accept it. These last two signals are the means by which the station controls the update circuit 17 to withhold acknowledgement.

Provided acknowledgement is to take place the input 31 of the exclusive-OR gate 30 receives the output of a bistable 33. Now the change to the acknowledgement field required is to reduce the count it holds by one. The bistable 33 is preset to hold a one, and the first bit of the acknowledgement field (the least significant of the biary representation of the count) is therefore changed by the exclusive-OR gate 30 from one to zero or zero to one, as required.

The output of the bistable 33 is also applied to two AND gates 34 and 325 which are enabled in turn by an alternating bit stream 1010 . . . . The bistable 33 is therefore reloaded through the gate 34 with its initial one for the second bit of the serial stream, which is the mirror to the first bit and is also changed by the exclusive-OR gate 30. The AND gate 35 is then enabled and will reload the contents of the bistable 33 only if the signal on the line 15 is a one. This bit is however the mirror bit. If the initial bit was a one, the mirror bit will be a zero, the bistable 33 will be cleared, and from then on the serial stream will be unchanged, which is the effect required. A count of 5, for example, held as 10011001 will be changed to 01011001, representing 4.

If the initial bit was a zero, the bistable 33 is reloaded with a one for the third and fourth bits, which will also be changed. In fact the value held in the bistable 33 can be regarded as a borrow which is propagated while the unmirrored bits of the binary representation are zero until it meets a one, which with its mirror bit is inverted and the borrow then extinguished. Thus a count of 4, 01011001, is changed to 10100101, which is 3 as required.

5,6,7 ones detect circuit

Figure 7:
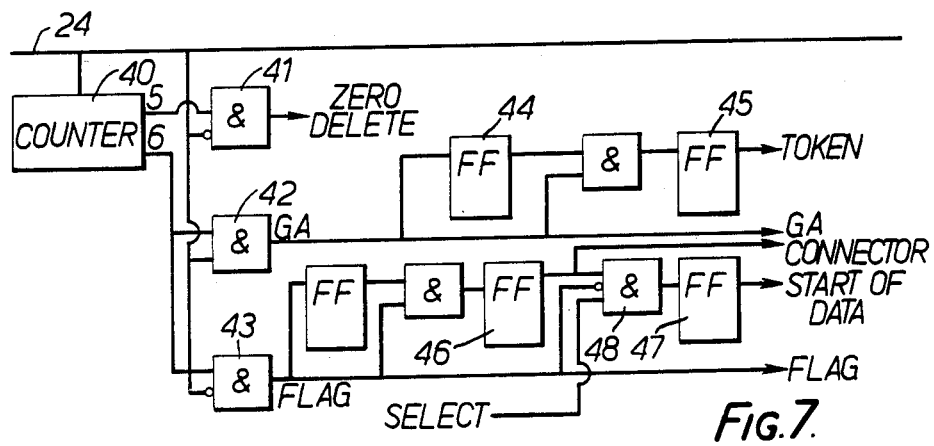
FIG. 7 is a logic diagram of the 5,6,7 ones detection circuit.

Referring to FIG. 7, the 5,6,7 ones detect circuit applies the serial input data received from the path 24 to a counter 40, which is counted up by each one and reset by each zero. It therefore holds a count of the number consecutive ones received. It outputs a signal when a count of five is reached; this signal and the inverse of the current data bit are applied to an AND gate 41 which outputs the ZERO DELETE signal if the bit following the five ones is a zero.

The counter 40 outputs another signal when it detects six ones. This signal is applied to an AND gate 42 with the current data bit and to an AND gate 43 with its inverse. The AND gate 42 outputs the go-ahead recognition signal GA when the bit following the six ones is itself one and the flag recognition signal FLAG when it is zero.

The arrangement is chosen to give as early a recognition as possible of the bit sequences requiring action.

The GA signal sets a bistable 44 so that two successive go-aheads set a bistable 45 to produce a signal TOKEN to indicate the detection of a token. Two successive FLAG signals similarly set a bistable 46 to output a CONNECTOR signal indicating the detection of the connector. A bistable 47 is then set to indicate the start of significant data, additional leading flags being eliminated by combining the CONNECTOR signal in an AND gate 48 with the inverse of the FLAG signal and a SELECT signal that is produced only at those times a FLAG signal might occur.

Acknowledgement checking circuit

Figure 8:
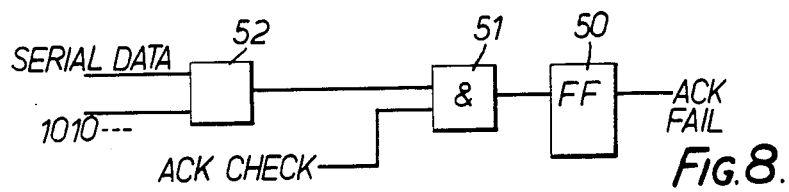
FIG. 8 is a logic diagram of the acknowledgement field check circuit.

Referring to FIG. 8 the acknowledgement checking circuit 28 produces the ACK FAIL signal from a bistable 50. This bistable is enabled to be set by a signal ACK CHECK applied to an AND gate 51 and produced, providing the unit is transmitting, in response to the flag following the FCS and for the duration of the acknowledgement field. The serial input data stream is applied to a comparator 52 together with the alternating stream 1010 .... A count of zero is represented by 01010101 and therefore will never yield equality and an output signal from the comparator 52. But any departure from this pattern will produce a signal that sets the bistable 50 and causes the ACK FAIL signal to be passed to the controller.

Token-to-connector converting circuit

Figure 9:
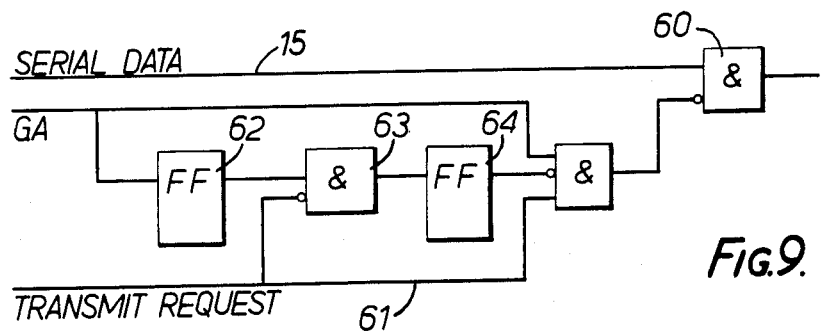
FIG. 9 is a logic diagram of the token-to-connector converter circuit.

Referring to FIG. 9, broadly, the token converter circuit 18 applies the serial input data on the line 15 and the inverse of the go-ahead recognition signal GA to an AND gate 60, which is thus disabled when the go-ahead is recognised, changing the bit following the six ones from a one to a zero and converting the go-ahead to a flag. This action is normally enabled by a transmit request signal from the controller on a line 61. However, the action must be carried out for either both go-aheads of the token or neither. If the controller requests transmission afer one go-ahead has already passed the next must not be changed. To ensure this requirement is met the GA signal, preserved in a bistable 62, sets a bistable 63 if it arrives before the transmit request. That inhibits the application of the next GA signal to the AND gate 60.

General

The acknowledgement field is supplied by the controller set to the expected number of destination stations in the acknowledgement scheme. For example if one of the set which would normally receive the message is inoperative and by-passed by the ring, the count will be adjusted accordingly. The scheme is simple to operate because the action each station must take to carry out the acknowledgement is essentially the same—to decrease the count by one—and does not depend on the position or address of the station. And it is very simple to check, since the final value of the ACK field does not depend on which particular stations are concerned.

Since each station must make a positive acknowledgement, if the count returns as zero the originating station has a high level of assurance that all the expected stations are present and have accepted the message. If any station becomes inoperative and drops out of the ring the originating station cannot remain unaware of the fact since the final value of the count will change. The reason may then be discovered using the recovery procedure and stations will adjust the number of stations they expect to reply. .

As has been mentioned, not every station need take part in the acknowledgement scheme. For instance in a configuration like that shown in FIG. 1, it might be preferred to restrict it to just the CPUs and use separate messages for acknowledging disc transfers. In that case DONACK will be permanently set in a station not in the group participating in the acknowledgement scheme. Alternatively it may have a simpler interface unit with no acknowledgement update or checking circuit. Messages from a station not taking part should include a dummy acknowledgement field which may be changed by participating stations but will not be checked.

As so far described, a participating station asserts DONACK if it cannot accept a message. That leads to a system in which acknowledgements are expected from all participating stations. However, DONACK can in addition be asserted unless the controller recognises its address in the message. That leads to a system in which acknowledgements are expected only from stations to which the message is addressed.

For greater security additional checks on the data may be performed. For example if the data part of messages (prior to bit stuffing) should equal a whole number of bytes the received data after bit stripping may be counted to ensure that this condition is still met.

Since the acknowledgement field is outside the FCS-checked part of the message and errors introduced on transmission will not be detected, the acknowledgement field may be repeated, for example being sent three times in all. The count must then be zero each time if successful receipt is to be assumed.

The system described combines error checking and message acceptance into one acknowledgement field. If desired a separate count may be used for each. And an additional count may be introduced for address recognition, a station acknowledging in this count when it recognises that it is addressed by an individually addressed or broadcast message whether or not it can accept the message. It may then be desired to transfer the latter count to the body of originating station to allow it to ascertain the number of stations active in the ring which respond to a given address. A count may simply acknpwledge presence.

It will be realised that while a station is transmitting the ring is broken into a loop starting and ending at that station. The invention may of course be applied in a system arranged as a permanent loop, but only messages originating at the station to which the ends of the loop are connected can be sensibly acknowledged, since messages from other stations will not return past that station.

The token chosen, in which each of two bytes must be changed, has the advantages that it is more secure than either a single go-ahead or one of the same length that is changed at only one bit position. Yet on conversion to a connector it remains compatible with HDLC, which allows multiple flags at the start of a message. It also ensures that the control codes in the middle of messages—the single flags—will be distinguishable from the start of a message, which has multiple flags, without the need to multiply the patterns that must be recognised.

We claim:

1. A method of data communication which comprises transmitting a message from a first station, which message includes an acknowledgement field holding a count set at an initial value, passing the message successively through each of a plurality of other stations, some at least of which are destination stations, some of said destination stations perform an acknowledgement to indicate acceptance of the message, said acknowledgement comprising changing the said count in the acknowledgement field of the message by an amount and in a direction that is constant and the same for every one of said destination stations, returning a final value of said count to the first station, and checking whether said final value equals a predetermined reference value corresponding to acknowledgement by every one of said destination stations.

2. A method as claimed in claim 1, in which the initial value of the count is equal to n, there are n stations in said group, said acknowledgement comprises decreasing the count by one, and the reference value equals zero.

3. A method as claimed in claim 1, in which transmission is bit-serial and the acknowledgement field comprises a sequence of bits together forming, in order of transmission, a binary representation of the count taken least-significant bit first.

4. A method as claimed in claim 3, in which the acknowledgement field comprises a sequence of consecutively transmitted bits divisible into pairs of consecutive bits in each of which pairs one bit is a bit of the said binary representation and the other bit is its inverse.

5. A method as claimed in claim 1, in which acknowledgement is withheld by any destination station that would otherwise acknowledge the message if the station detects that there is an error in the message as received.

6. A method as claimed in claim 1, in which acknowledgement is withheld by any destination station that would otherwise acknowledge the message if the station is unable to accept the message.

7. A method as claimed in claim 1, in which the stations are connected in sequence to provide a loop starting at and returning to the first station and around which the said message passes.

8. A method as claimed in claim 7, in which the first station retains a right to transmit until it transmits a token enabling any station that subsequently receives the token and is able to accept the token to transmit.

9. A method as claimed in claim 8, in which the token contains a plurality of identical sequences of signals, which sequence does not appear in a message.

10. A method as claimed in claim 1, in which the first station retains a right to transmit until it has carried out the said checking of the final value, and then either employs or relinquishes that right depending on whether the final value equals said reference value.

11. A method as claimed in claim 10, in which the first station relinquishes the right to transmit if the final value equals the reference value but otherwise conducts a recovery procedure.

12. A data communication system comprising a network of stations, at least one of the stations being a first station having means for transmitting a message including an acknowledgement field holding a count set at an initial value, the stations of the network being interconnected by transmission links for a sequential flow of the message through a plurality of other stations of the network with at least the acknowledgement field returning to the first station, the said other stations comprising destination stations each which has means for acknowledging acceptance of such a message by changing the value of the said count in the acknowledgement field of the message by an amount and in a direction that is constant and the same for every destination station, and the first station having means for receiving a final value of the count in a returned acknowledgement field and means for checking whether the final value of the count equals a predetermined reference value corresponding to acknowledgement by every one of said destination stations.

13. A system as claimed in claim 12, in which the initial value of the count is to equal n, there are n stations in said group, each means for acknowledging a message comprises means for decreasing the count by one, and the means for checking checks whether the final value of the count is zero.

14. A system as claimed in claim 12 in which transmission is bit-serial and the acknowledgement field comprises a sequence of bits together forming, in order of transmission, a binary representation of the count taken least-significant bit first, and each of the said means for acknowledging a message comprises means for selectively inverting the said bits.

15. A system as claimed in claim 14, in which the acknowledgement field comprises a sequence of consecutively transmitted bits divisible into pairs of consecutive bits in each of which pairs one bit is a bit of the said binary representation and the other bit is its inverse, each means for acknowledging a message inverting either both or neither of the bits of each of the said pairs.

16. A system as claimed in claim 12 in which each means for acknowledging a message is controllable in response to an indication that there is an error in the message as received to withhold acknowledgement.

17. A system as claimed in claim 12 in which each acknowledgement means is controllable in response to an indication that the station cannot accept a message to withhold acknowledgement.

18. A system as claimed in claim 12 in which the stations of the network are interconnected in a ring, a message output by any station circulating round the ring and returning to that station.

19. A system as claimed in claim 18, in which each station includes means for outputting a token enabling any station that subsequently receives and is able to accept the token to transmit a message and conversion means controllable if the station is about to transmit in response to a token to convert the token into a pattern distinguishable therefrom.

20. A system as claimed in claim 19, in which the means for outputting a token is responsive to an indication from the means for checking that the final value of the count equals the reference value to output the token.

21. A system as claimed in claim 19, in which the means for outputting a token includes means for generating a signal pattern that does not occur in a message, the said means being operated a plurality of times in generating the token, and the conversion means include means which while a token is being converted operate on the said signal pattern in an identical way each time the pattern is converted.

22. A system as claimed in claim 12 in which the first station includes means for transmitting, following receipt of a returned acknowledgement field, a signal pattern indicative of relinquishment of a right to transmit, which means is controllable in response to the means for checking to inhibit transmission of the said signal pattern in the event that said final value differs from said reference value.

* * * * *